(12) United States Patent
MacLellan

(10) Patent No.: US 6,382,671 B1
(45) Date of Patent: May 7, 2002

(54) TRAILER FRAME

(76) Inventor: Bernard Aloysius MacLellan, Highway #4, Brucefield, Ontario (CA), N0M 1J0

( * ) Notice: Subject to any disclaimer, the term of this patent is extended or adjusted under 35 U.S.C. 154(b) by 0 days.

(21) Appl. No.: 09/472,908

(22) Filed: Dec. 27, 1999

Related U.S. Application Data

(60) Provisional application No. 60/114,537, filed on Dec. 31, 1998.

(51) Int. Cl.[7] ............................................. B62D 63/06
(52) U.S. Cl. ........................ 280/789; 280/788; 296/181
(58) Field of Search ................................ 280/789, 788, 280/106, 124.116, 638; 414/495; 296/181, 26.12, 26.13, 26.14, 26.15

(56) References Cited

U.S. PATENT DOCUMENTS

| | | | | |
|---|---|---|---|---|
| 3,623,744 A | * | 11/1971 | Bertness | ...................... 280/106 |
| 5,207,168 A | * | 5/1993 | Comer | ........................ 111/200 |
| 5,215,331 A | * | 6/1993 | Pittman | ...................... 280/788 |
| 5,249,821 A | * | 10/1993 | Ricketts et al. | ............. 280/638 |
| 5,607,270 A | * | 3/1997 | Zimmerman | ................... 410/3 |
| 5,906,470 A | * | 5/1999 | Desjardins | ................... 414/495 |
| 5,951,032 A | * | 9/1999 | Overby et al. | ......... 280/124.116 |

* cited by examiner

Primary Examiner—Kenneth R. Rice
Assistant Examiner—Christopher Buchanan
(74) Attorney, Agent, or Firm—Daryl W. Schnurr

(57) ABSTRACT

A trailer has an improved trailer frame that results in a trailer that has the same width as previous trailers on the same axle without the necessity of wheel wells. The height of the trailer above a supporting surface is also the same as previously. The interior of the trailer is a rectangular box with no obstructions. The trailer is constructed by using side brackets with outwardly extending lips that support the side walls beyond the axle brackets and above the axle arms of the axle. The axle is a rubber torsion axle.

10 Claims, 10 Drawing Sheets

TRAILER FRAME

This application claims benefit of provisional appln 60/114,537 filed Dec. 31, 1998.

BACKGROUND OF THE INVENTION

1. Field of Invention

This invention relates to a trailer that is towed by a motor vehicle on public streets and highways. This invention relates to a trailer having an improved trailer frame that results in a wide trailer without wheel wells.

2. Description of the Prior Art

As is well known, trailers that are used on public streets and highways have certain width limitations. The current maximum legal trailer width to the outside surface of the wheel or wheels on each side of the trailer is 102 inches. Since each tire requires a width of approximately 9 inches including the necessary clearance, that leaves only 84 inches of space between the wheels. Obviously, a trailer wall must be spaced apart from the wheels by a safe distance as tire sizes can vary and tires themselves can vary in size from different levels of inflation. Also, the trailer walls themselves require some space and are sometimes 1.5 inches in thickness. If the trailer walls are one and a half inches thick, the usable space inside the trailer is 81 inches.

With torsion rubber axles, the outer edge of the axle support plates that are located inside each hub at either end of the axle are 79 inches apart. If a trailer wall is constructed on top of each support plate with the outer edge of the wall aligned with the outer edge of the support plate and the walls are one and a half inches thick, the maximum inside distance between the two walls is 76 inches. To obtain additional inside space, wheel wells are cut out in the trailer frame and floor so that each of the two side walls of the trailer can be extended out either partially or fully around the trailer wheels. A disadvantage of these wheel wells is that they often constitute an obstacle within the interior of the trailer and they interfere with the storage space. Also, they are time consuming and expensive to install.

With previous trailers that use rubber torsion axles, for a 3,500 pound axle, the maximum distance between the outer surfaces of the two side walls is 80 inches. For rubber torsion axles greater than 3,500 pounds and up to 7,000 pounds, the maximum distance between the outer surfaces of the two outside walls is 79 inches. When the outer surface of the two side walls exceeds 80 inches and 79 inches respectively for the two axles, wheel wells must be located in the interior walls of the trailer.

It is often desirable for customers to have a trailer with an outside width of 7 feet. With prior art trailers when used with a rubber torsion axle, the interior walls of such a trailer are interrupted by wheel wells. The wheel wells can be inconvenient as they limit storage space. Also, when the trailers are used as horse trailers, for example, the wheel wells can be an obstacle for both the horses and the handlers and can cause leg injuries.

SUMMARY OF THE INVENTION

It is an object of the present invention to provide a trailer and a method of constructing a trailer for use on public streets and highways having an outside width of seven feet from the surface of the two outside walls with no wheel wells penetrating the interior walls. It is a further object of the present invention to provide a trailer and method of constructing a trailer for use on public streets and highways where the height of the trailer floor above the supporting surface is not increased by the use of the present invention compared to conventional trailers.

A trailer for use with a towing vehicle on a public highway has a frame and an axle with wheels rotatably connected thereto. The frame has a periphery with a front, a rear and two sides. The frame has two side brackets, one side bracket of the two side brackets extending along each side of the frame. The axle has two axle brackets, one axle bracket of the two axle brackets being located at each end of the axle inside the wheels. One side bracket is affixed to each axle bracket. Each side bracket supports a side wall of the trailer beyond the axle brackets and above the axle arms.

Preferably, the trailer has a floor that is substantially straight inside the side walls from front to rear with no wheel wells.

Preferably, the axle is a rubber torsion axle. Still more preferably, the height of the floor above a supporting surface is not increased beyond the height of conventional trailers.

A method of constructing a trailer for use with a towing vehicle on a public highway as provided. The trailer has a frame and an axle with wheels rotatably connected thereto. The frame has a periphery with two sides. The periphery has a front, a rear and two parallel sides. Each side of said two sides supports a side wall of the trailer. The side walls have an outer surface, a distance between the outer surface of each side wall being at least seven feet. The method comprises constructing a floor of the trailer, installing side brackets along each of the two sides of the floor, connecting the side brackets to axle brackets on either end of the axle inside the wheels. The side brackets have an upper lip extending outward beyond the floor by at least a width of each side wall. The method includes constructing a side wall on each of the lips. The wall and the floor have an interior that is straight from front to rear without wheel wells.

DESCRIPTION OF A PREFERRED EMBODIMENT

Figure 1:
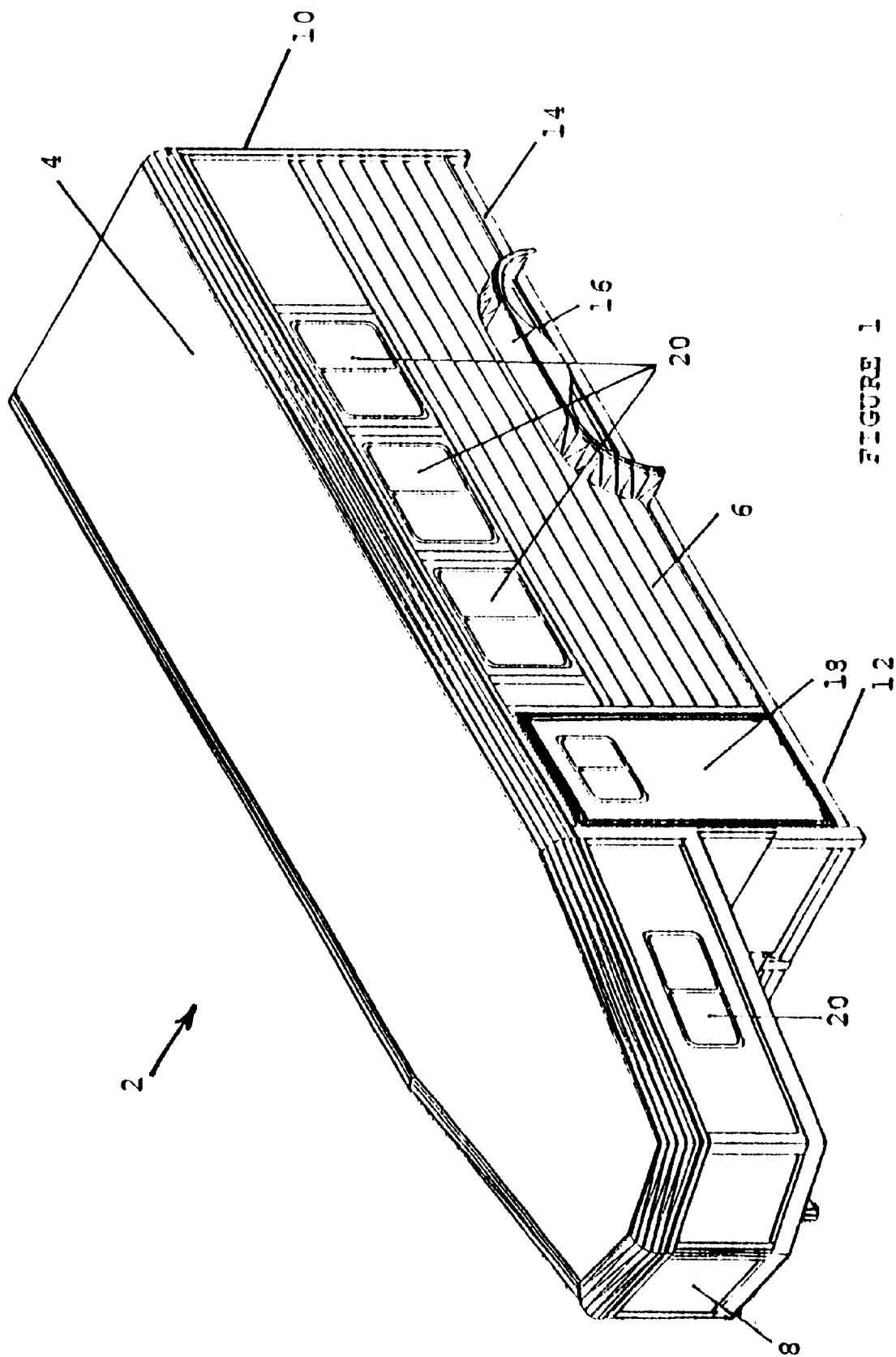
FIG. 1 is a perspective view of a horse trailer with the wheels omitted.

In FIG. 1, a trailer 2 has a top 4, two sides 6 (only one of which is shown in FIG. 1), a front 8 a rear 10 and a bottom 12. A side bracket 14 is located along a lower edge of the side 6. A fender 16 is mounted on the side wall 6. The fender 16 is designed to receive two wheels (not shown) with each wheel being mounted on a separate axle (not shown in FIG. 1). Trailers can be designed to have only one wheel on each side as well. The trailer 2 has a door 18 and a number of windows 20.

Figure 2:
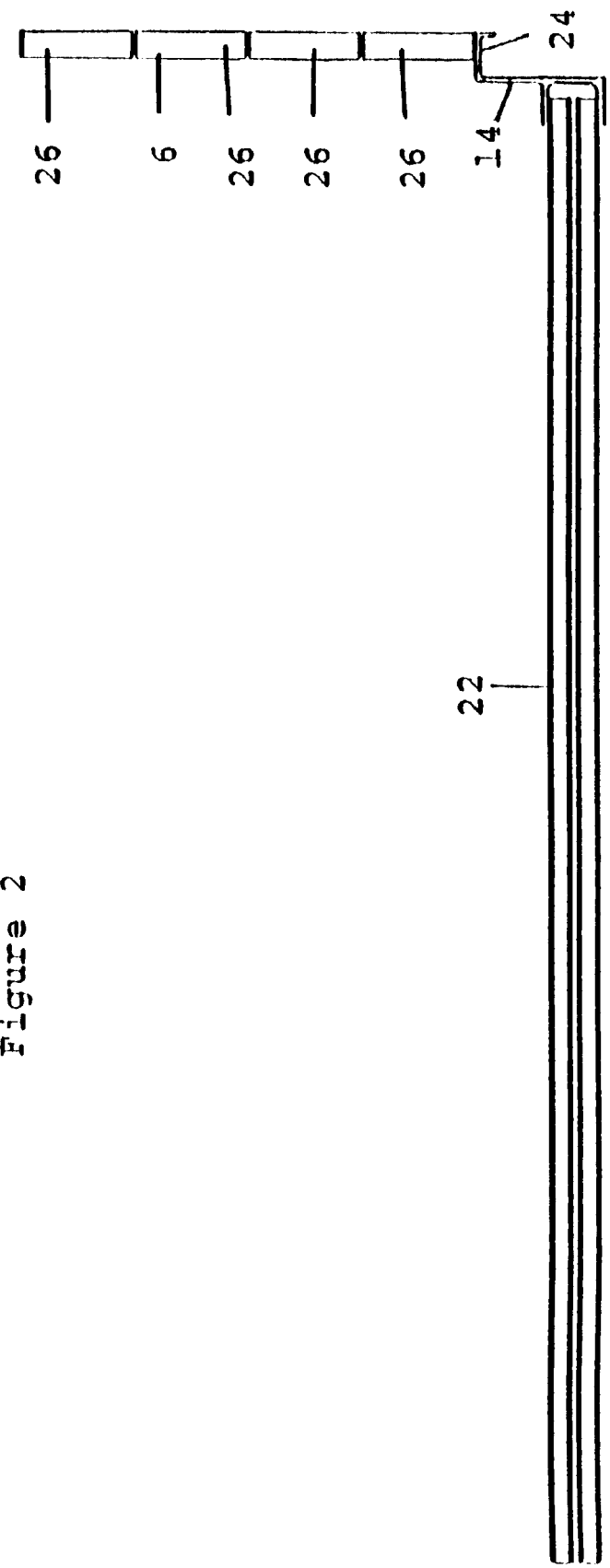
FIG. 2 is an end view of a trailer floor having one side bracket in place.

In FIG. 2, there is shown an end view of a floor 22 having the side bracket 14 extending along one side of the floor 22. A partially constructed side wall 6 is constructed on a lip 24 of the side bracket 14. The wall 6 consists of a plurality of tubular members 26. The invention is not limited to the type of wall that is constructed on the side bracket 14 and other types of walls could be used to practise the present invention.

Figure 3:
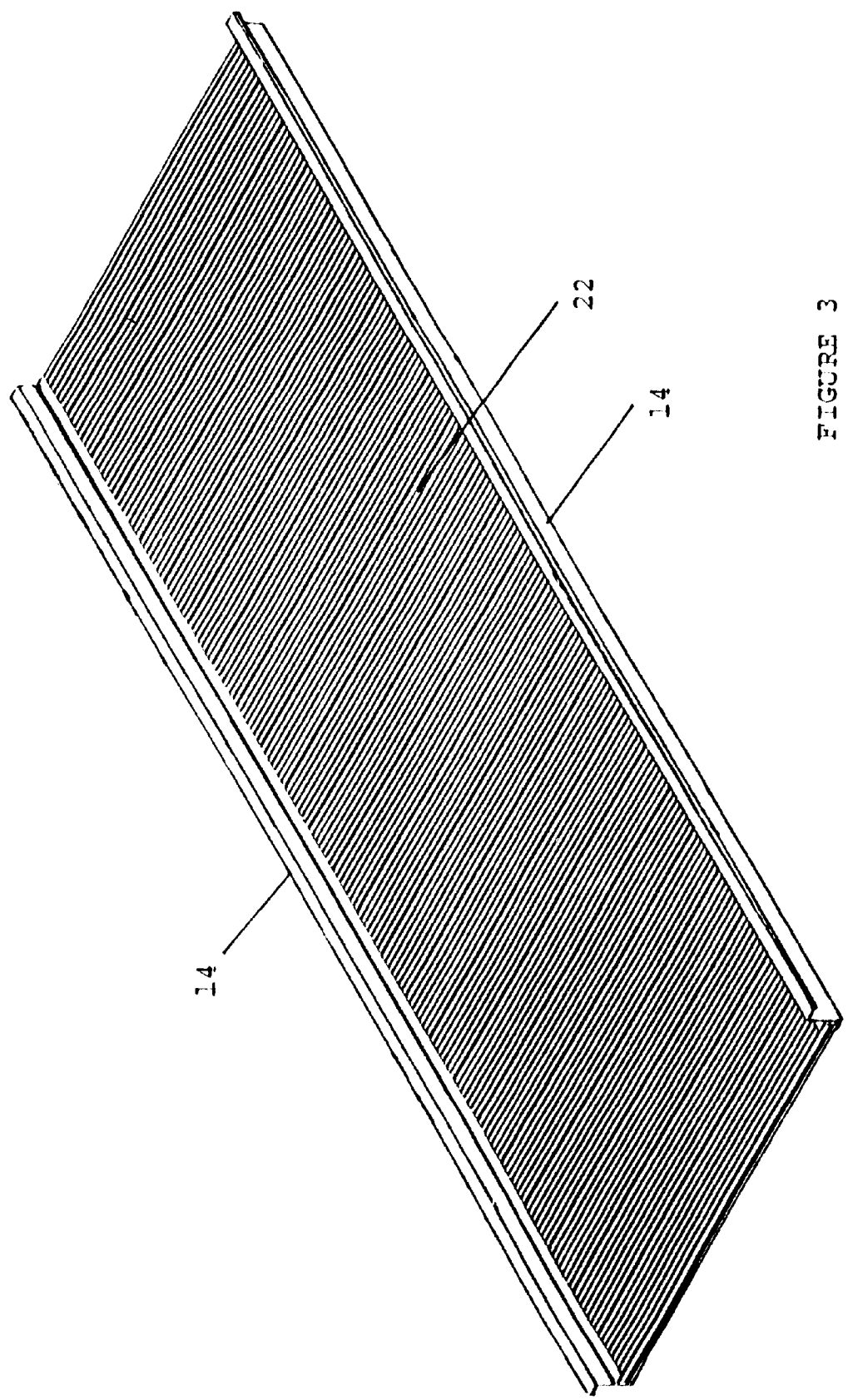
FIG. 3 is a perspective view of a trailer floor with both side brackets in place.

In FIG. 3, the floor 22 has two side brackets 14, one side bracket extending along each side of the floor 22. It can be seen that the two side brackets are identical to one another except that they are oriented so that one is a mirror image of the other.

Figure 4:
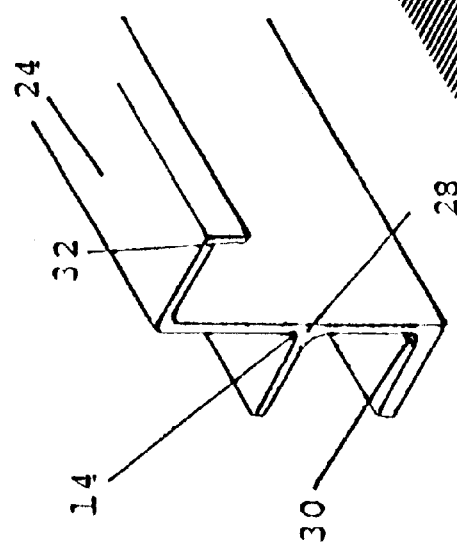
FIG. 4 is a perspective view of part of a side bracket.

In FIG. 4, it can be seen that the side bracket 14 has a vertical section 28 with a U-shaped portion 30 extending in one direction from a lower portion thereof and the lip 24 extending in an opposite direction from an upper portion of the vertical section 28. A flange 32 extends along an outer edge of the lip 24. While the side brackets 14 can be made from various materials, the side brackets are preferably made from extruded aluminum.

Figure 5:
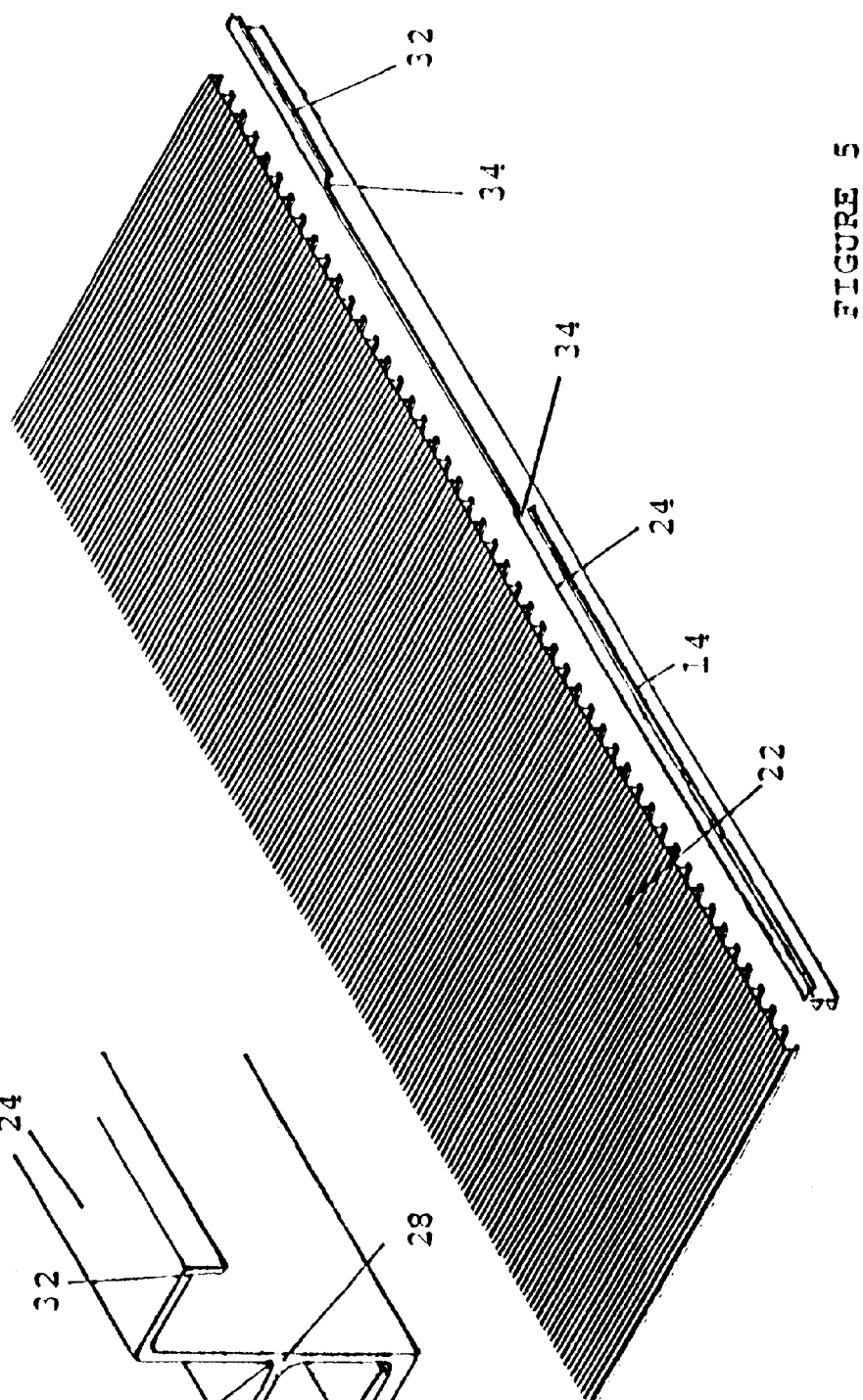
FIG. 5 is a perspective view of a floor with one side bracket that is partially cut away.

In FIG. 5, the side bracket 14 extends along one side of the floor 22. Part of the lip 24 and the flange 32 are cut away in an area 34 where the fender (not shown in FIG. 5) is to be inserted.

Figure 6:
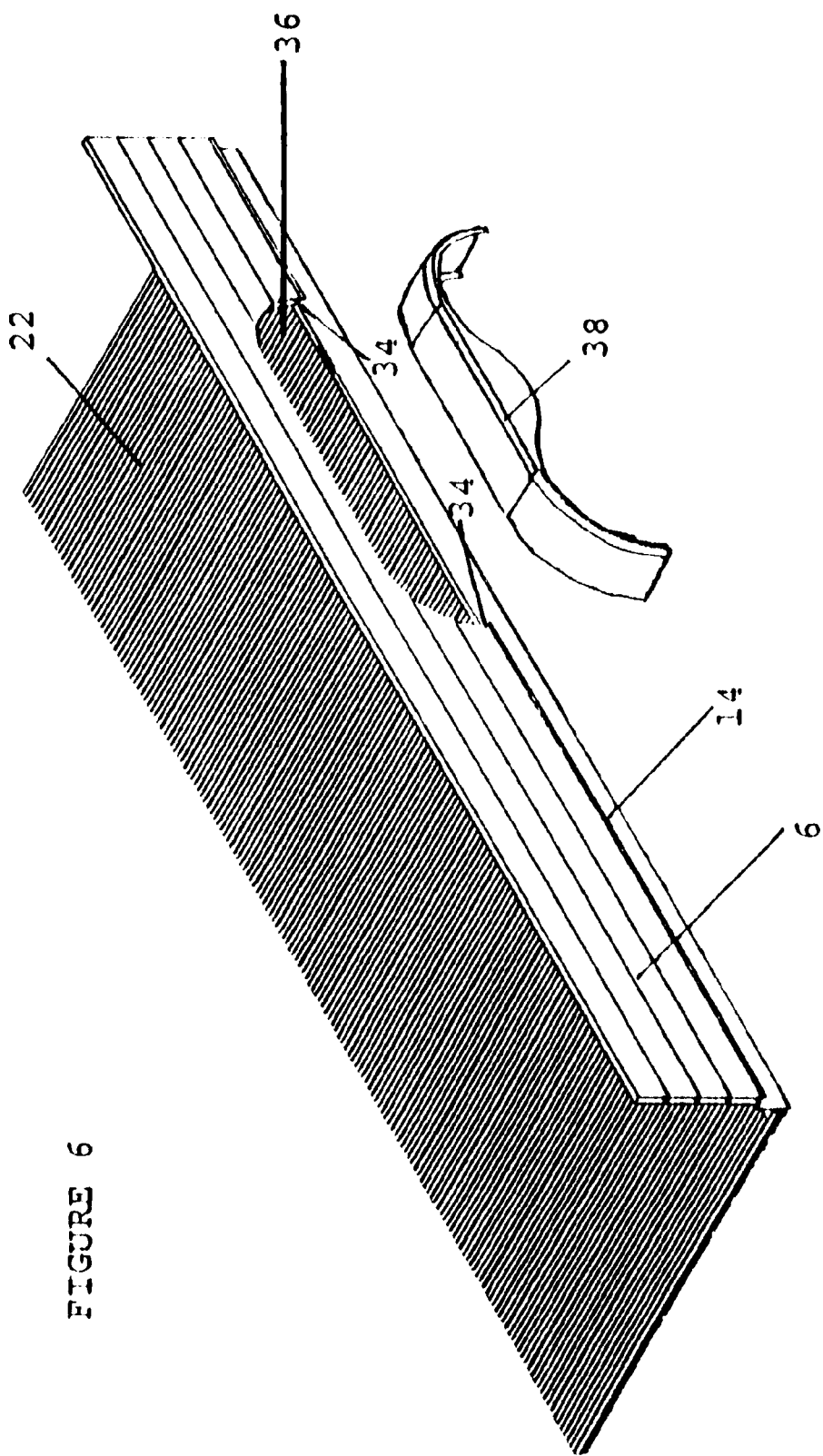
FIG. 6 is a perspective view of a floor with a partially constructed wall having an opening to receive a fender.
Figure 7:
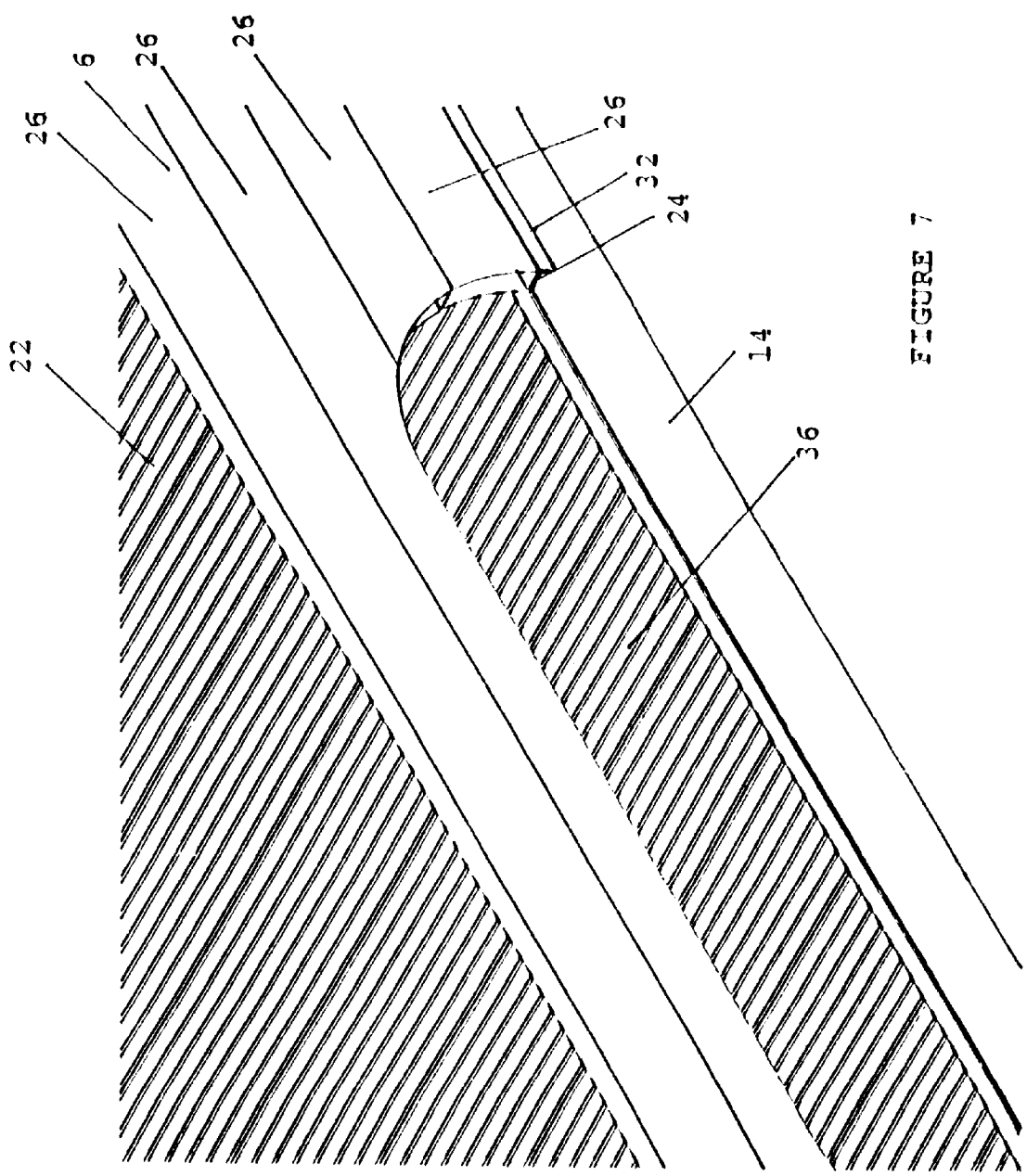
FIG. 7 is an enlarged partial perspective view of the opening for the fender.

In FIG. 6, the partial side wall 6 has been constructed on the side bracket 14 with an opening 36 cut away to receive the fender 38. In FIG. 7, an enlarged view of part of the opening 36 is shown. The same reference numerals are used to describe those components that are identical to the components of the previous figures.

Figure 8:
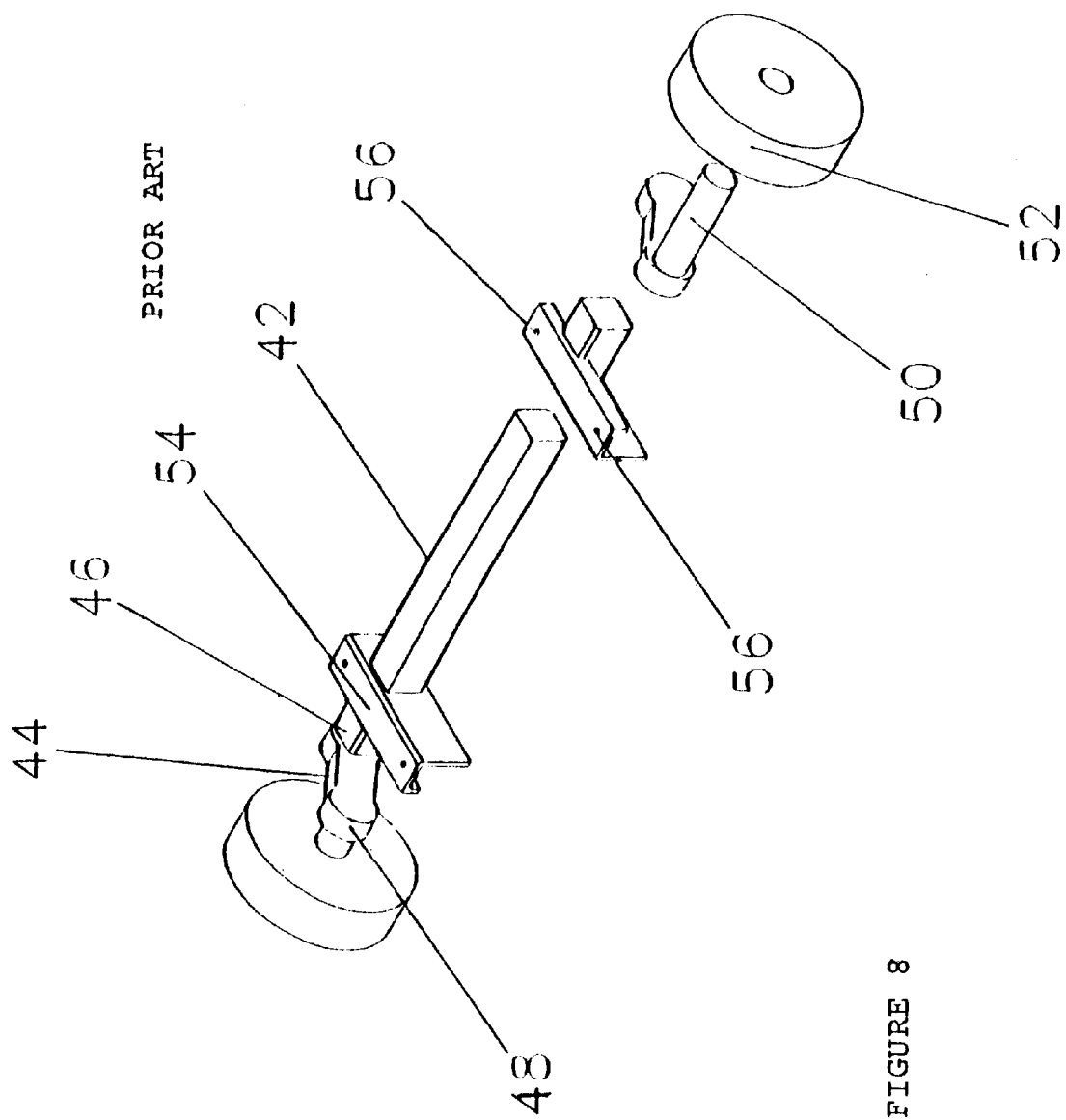
FIG. 8 is a partially exploded perspective view of a prior art rubber torsion axle.

In FIG. 8, there is shown a partially exploded perspective view of a rubber torsion axle 40 sold under the name TORFLEX (a trademark). The axle 40 has a rectangular shaped central member 42 that supports an axle arm 44 at one end 46. The axle arm 44 is pivotally mounted to the central member 42 and has a free end 48 that supports a bolt 50. The bolt 50 in turn rotatably supports a hub 52 for a wheel (not shown in FIG. 8). Just inside the axle arm 44, there is located an axle bracket 54 that has an L-shaped cross section. The axle bracket 54 has openings 56 on an upper surface thereof. The openings 56 are located to receive bolts (not shown) that extend through the U-shaped portion 30 of the side brackets 14 (not shown in FIG. 8) to hold the side brackets 14 in place on the axle 40. Of course, the axle has two ends 46, the components at each end being designated by the same reference numeral.

Figure 9:
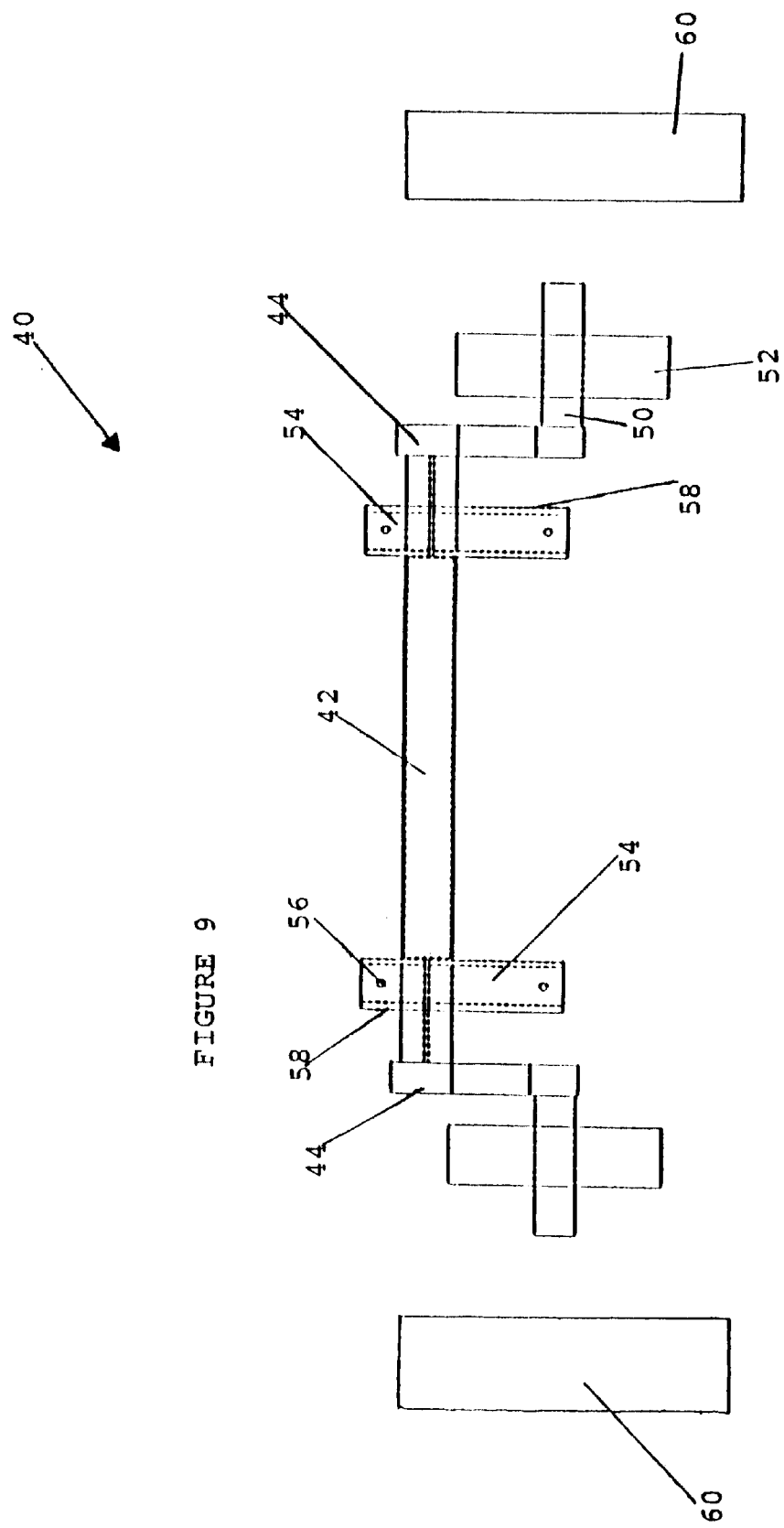
FIG. 9 is a schematic top view of a prior art rubber torsion axle with wheels.

In FIG. 9, there is shown a top view of the prior art axle 40. The same reference numerals are used in FIG. 9 to describe those components that are identical to the components of FIG. 8. It can be seen that the axle 40 has two axle brackets 54. Outer edges 58 of the axle brackets 54 are located 79 inches apart from one another for a greater than 3,500 pound to a 7,000 pound axle. For a 3,500 pound axle, the outer edges of the axle brackets are also located 79 inches apart from one another. The vertical section 28 of each of the side brackets 14 (not shown in FIG. 9) is aligned with the outer edge 58. The lips 24 each extend outward approximately 2 and ½ inches. Therefore, the outer surface of the outer walls 6 are substantially 84 inches apart from one another for axles ranging from 3,500 pounds to 7,000 pounds. The axle 40 has two wheels 60 shown separately from each end 46 that can be affixed to the hubs 52. The wheels 60 can each be affixed to one of the hubs 52.

Figure 10:
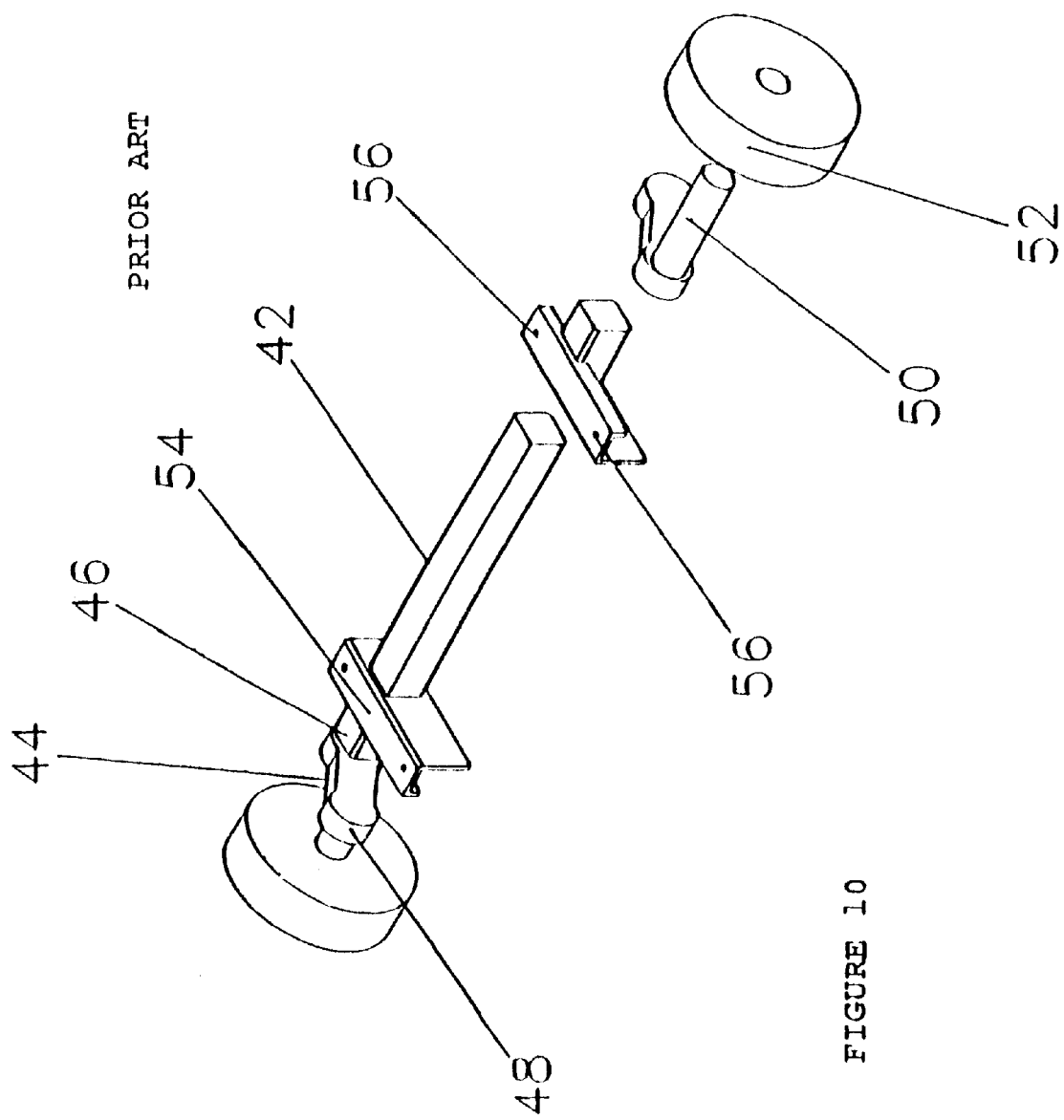
FIG. 10 is a perspective view of a prior art rubber torsion axle.

FIG. 10 is a perspective view of the prior art axle of FIGS. 8 and 9. The same reference numerals are used in FIG. 10 as those used in FIG. 9 to describe those components that are identical to one another. From FIG. 10, it can be seen that the axle brackets 54, which support the side brackets 14 (not shown in FIG. 10) are at a lower level than the axle arms 44. Thus, a lower surface of the floor of the trailer is located at a lower level than the lowermost position of the axle arms. The lower surface of the floor would preferably be at the same level as the upper surface of the axle arms.

Figure 11:
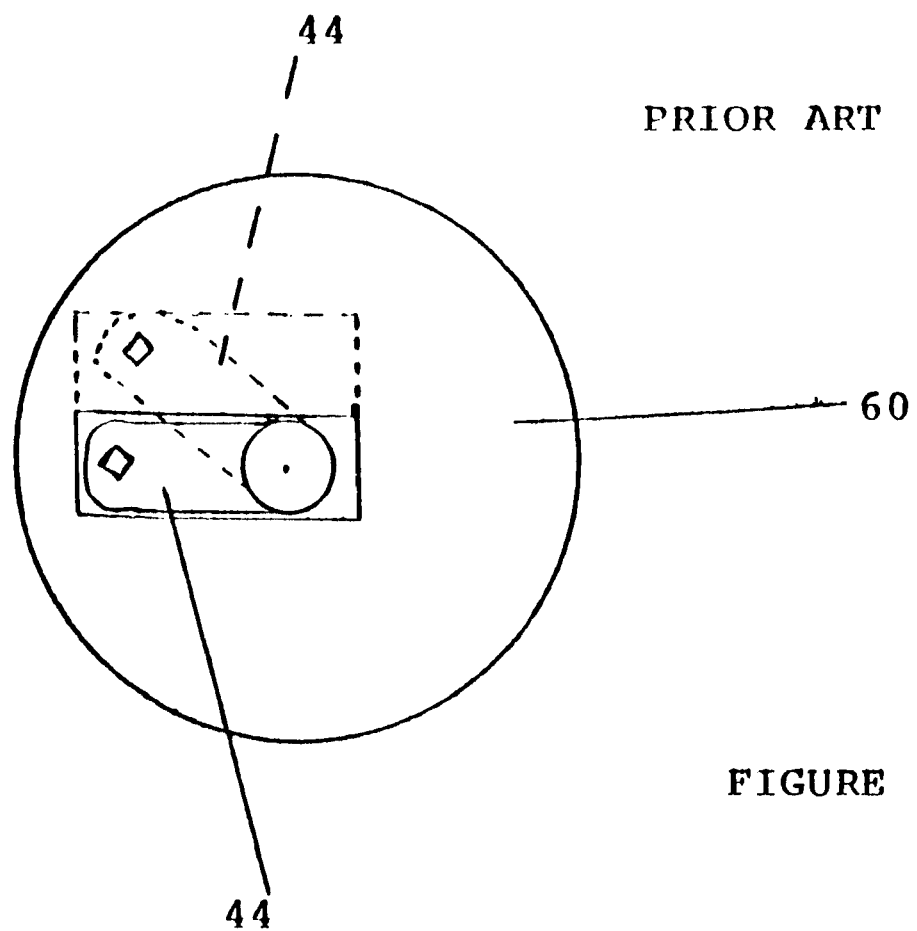
FIG. 11 is a schematic side view of the maximum and minimum ranges of a prior art axle arm.

In FIG. 11, the minimum (lower) and maximum (upper) range of the axle arms 44 is shown schematically for a wheel 60. The minimum range is shown in solid lines and the maximum range is shown by dotted lines.

Preferably, the lowermost edge of each side wall is welded to the outer portion of the lip 24. Also, when the area 34 is cut away, part of the lip is left in place to preserve strength within the side bracket 14 and also to provide a smooth interior surface for the trailer. No part of the cutaway area 34 is visible inside the trailer. If the trailer did not have fenders, it would not be necessary to cut away part of the lip. The purpose of the cutaway area is provide a location where the fender can be affixed. It can be seen that the floor 22 is not cut away at all to allow for the fender. The height of the floor 22 above a road surface (not shown) is determined by the size of the tire which can be 14 inches, 15 inches, 16 inches or even 17 and ½ inches. While tire sizes can vary, the height of the floor above the road surface will be the same for the trailer of the present invention as it is for prior art trailers. The cutaway portion is not visible from inside the trailer and the floor and side bracket forms a substantially straight line from the front to the rear of the trailer. No wheel well is located inside the trailer. While the side brackets are shown to extend along two sides of the floor, preferably, the periphery of the floor is surrounded by a frame that includes the two side brackets, one side bracket on each side.

I claim:

1. A trailer for use with a towing vehicle on a public highway, said trailer comprising a frame with a floor, two side walls and a roof connecting said side walls, said frame having an axle with, axle arms and wheels rotatably connected thereto, said frame having a periphery with a front, a rear and two sides, said frame having two side brackets, one side bracket of said two side brackets extending along each side of said frame, said axle having two axle brackets, one axle bracket of said two axle brackets being located at each end of said axle inside said wheels, one side bracket being affixed to each axle bracket, each side bracket supporting a side wall of said trailer beyond said axle brackets by at least 1.5 inches and above said axle arms.

2. A trailer as claimed in claim 1 wherein each side bracket is shaped to support a side wall of said trailer beyond said axle brackets by at least a distance equal to a thickness of one side wall.

3. A trailer as claimed in claim 2 wherein said frame supports a floor, said floor being substantially straight inside said side walls from front to rear with no wheel wells.

4. A trailer as claimed in claim 2 wherein said frame supports a floor, said floor having a lower surface, said lower surface being located at a lower level than a lowermost position of said axle arms.

5. A trailer as claimed in claim 3 wherein each side wall has an outer surface, said frame and side brackets being sized so that a distance between said outer surfaces of said side walls is at least seven feet.

6. A trailer as claimed in claim 2 wherein said axle is a rubber torsion axle.

7. A trailer as claimed in claim 5 wherein each side wall is substantially 1.5 inches thick.

8. A trailer as claimed in claim 6 wherein the axle has a capacity ranging from approximately 3,500 pounds to 7,000 pounds.

9. A trailer as claimed in claim 5 wherein the axle brackets each have an outer edge, a distance between said two outer edges being at least 79 inches each side bracket supporting a side wall of said trailer beyond said axle brackets by at least 2.5 inches.

10. A method of constructing a trailer for use with a towing vehicle on a public highway, said trailer having a frame and an axle with wheels rotatably connected thereto, said frame having a periphery with two sides, said frame having two side brackets, one side bracket of said two side brackets extending along each side of said frame, said method comprising constructing a floor of said trailer on said frame, installing said side brackets along each of said two sides of said frame, connecting said side brackets to axle brackets on either end of said axle inside said wheels, said side brackets having an upper lip extending outward beyond said floor by at least a width of each side wall, constructing a vertical side wall on each of said lips, there being two side walls, each of said side walls and said floor having an interior that is substantially straight from front to rear without wheel wells, and constructing a roof interconnecting said side walls.

* * * * *